(12) United States Patent
Kim et al.

(10) Patent No.: US 6,746,314 B2
(45) Date of Patent: Jun. 8, 2004

(54) NITRIDE CMP SLURRY HAVING SELECTIVITY TO NITRIDE

(75) Inventors: Hyung Hwan Kim, Kyoungki-do (KR); Sang Ick Lee, Kyoungki-do (JP)

(73) Assignee: Hynix Semiconductor Inc., Kyoungki-do (KR)

( * ) Notice: Subject to any disclaimer, the term of this patent is extended or adjusted under 35 U.S.C. 154(b) by 20 days.

(21) Appl. No.: 10/053,565

(22) Filed: Jan. 22, 2002

(65) Prior Publication Data

US 2003/0013385 A1 Jan. 16, 2003

(30) Foreign Application Priority Data

Jun. 29, 2001 (KR) .......................................... 2001-38115

(51) Int. Cl.$^7$ ................................................. B24B 1/00
(52) U.S. Cl. .............................. 451/41; 451/36; 451/60; 252/79.1; 51/306
(58) Field of Search .................. 451/47, 36, 60; 51/306, 309, 307; 438/692, 693, 645, 691; 252/79.1–79.3

(56) References Cited

U.S. PATENT DOCUMENTS

| | | | | |
|---|---|---|---|---|
| 5,084,071 A | * | 1/1992 | Nenadic et al. | 51/309 |
| 5,209,816 A | * | 5/1993 | Yu et al. | 438/693 |
| 5,264,010 A | * | 11/1993 | Brancaleoni et al. | 51/308 |
| 5,700,383 A | * | 12/1997 | Feller et al. | 438/645 |
| 5,922,091 A | * | 7/1999 | Tsai et al. | 51/306 |
| 5,993,686 A | * | 11/1999 | Streinz et al. | 252/79.3 |
| 6,239,032 B1 | * | 5/2001 | Nakamura et al. | 438/693 |
| 6,361,402 B1 | * | 3/2002 | Canaperi et al. | 451/41 |
| 6,530,967 B1 | * | 3/2003 | Misra | 51/307 |

FOREIGN PATENT DOCUMENTS

| | | | | |
|---|---|---|---|---|
| GB | 2247892 | * | 3/1992 | 451/36 |

OTHER PUBLICATIONS

Communication from Taiwan Intellectual Property Office dated Aug. 22, 2003.

* cited by examiner

Primary Examiner—George Nguyen
(74) Attorney, Agent, or Firm—Marshall, Gerstein & Borun LLP

(57) ABSTRACT

A nitride CMP slurry having selectivity to nitride over oxide. The slurry increases the polishing speed of a nitride film by varying the pH of the slurry, and polishes the nitride film faster than an oxide film by decreasing the polishing speed of the oxide film. As a result, the slurry provides a CMP process for manufacturing a high density and highly integrated semiconductor device and a structural development of new concept device.

16 Claims, 2 Drawing Sheets

NITRIDE CMP SLURRY HAVING SELECTIVITY TO NITRIDE

BACKGROUND

1. Technical Field

A slurry used in a chemical mechanical polishing (abbreviated as 'CMP') process of a semiconductor manufacturing process is disclosed more specifically. A CMP Slurry is disclosed that is used for processing SiN or SiON films (abbreviated as 'nitride films') and that has a lower selectivity to an SiO film (abbreviated as 'oxide film').

2. Description of the Related Art

Recently, much interest has been focused on a method for forming fine patterns in a semiconductor manufacturing processes. Accordingly, there are strong demands for a wide planarization technology to cure unevenness on chip and wafer surface.

The CMP process is one of the planarization technologies employed with lithography processes in the manufacturing of semiconductor devices. IBM developed the CMP process in late 1980's by combining a chemical removing process and a mechanical polishing process.

Due to recent miniaturization, high density and multi-layer structures of semiconductor devices, current CMP processes adjust the polishing speed of the wafer and include chemical additives in the slurry to achieve local planarization.

In more detail, a chemically removable material is removed by using a chemical material having high reactivity and a processed material of a CMP slurry and the surface of the wafer is mechanically processed by using a fine abrasive at the same time. A liquid phase slurry is injected between the surface of the wafer and a rotating elastic pad.

The CMP process is essential to achieve a high density and high integration of a memory semiconductor over 64M and a non-memory semiconductor over 250 MHz.

The generally-used CMP slurry is an oxide CMP slurry. An oxide film is polished at least twice by this slurry as fast as a nitride film. Accordingly, using the nitride film as a stopping layer results in a polishing of the oxide film. The oxide CMP slurry has N/O (ie—nitride to oxide) selectivity below 0.5.

However, when the nitride film is polished by using the oxide CMP slurry in a damascene metal gate process, the oxide film has a higher polishing speed than the nitride film, and thus a dishing phenomenon of the oxide film used as an interlayer dielectric layer occurs. It deteriorates in a succeeding photolithography or etching processes and makes it impossible to form a barrier nitride film according to the CMP process.

Consequently, the oxide CMP slurry cannot be used to polish the nitride film deposited on a substrate patterned with an oxide film.

SUMMARY OF THE DISCLOSURE

Accordingly, a CMP slurry composition having nitride to oxide etching selectivity of N/O>1 is disclosed, and a semiconductor device manufactured according to a CMP process using the composition is also disclosed.

A nitride CMP slurry composition is disclosed which has selectivity to a nitride film by generating a difference in a polishing speed of the nitride and oxide films, by varying pH of the slurry with phosphoric acid.

BRIEF DESCRIPTION OF THE DRAWINGS

The disclosed CMP slurry, method of use thereof and semiconductor devices made with will be described in conjunction with the following figures wherein.

DETAILED DESCRIPTION OF THE PRESENTLY PREFERRED EMBODIMENTS

Figure 1:
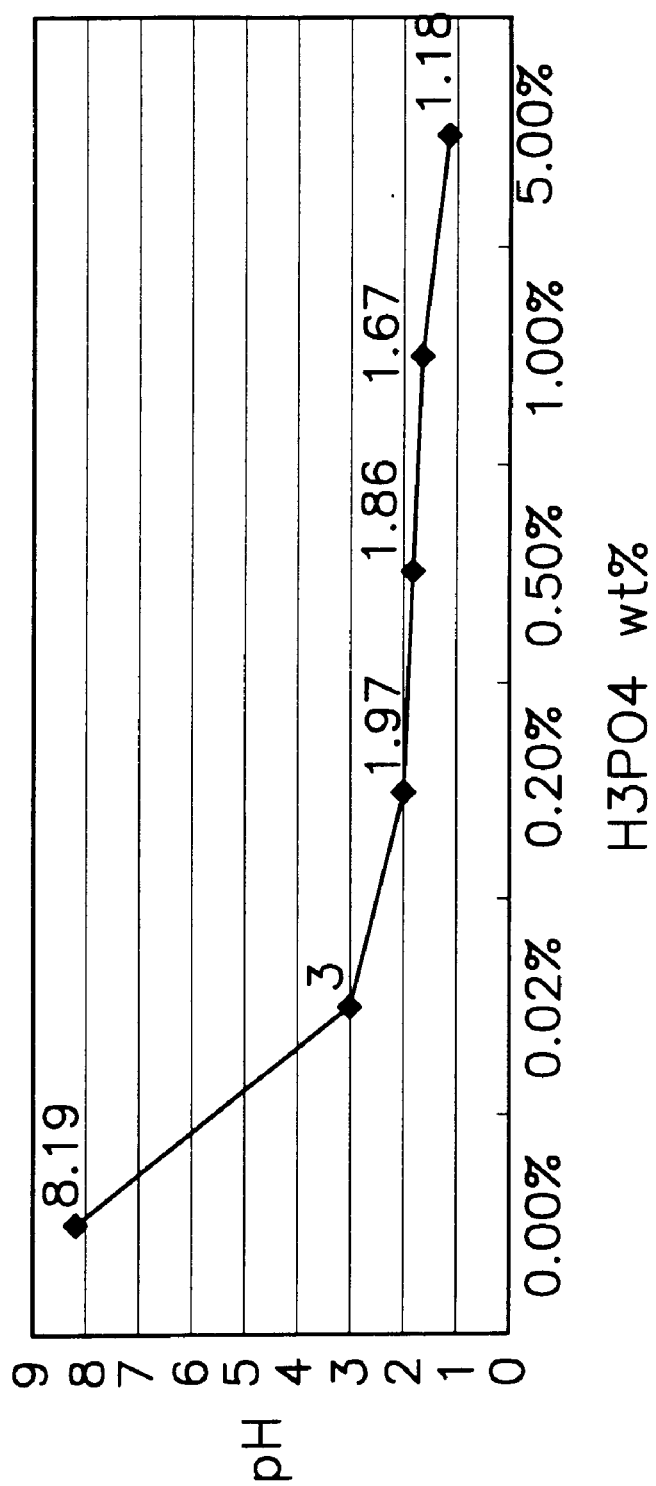
FIG. 1 illustrates, graphically, pH variations of a slurry by a weight ratio of $H_3PO_4$.

A nitride CMP slurry has selectivity to nitride by containing an abrasive and phosphoric acid. Here, the pH of the slurry ranges from 1 to 5, preferably 1 to 3, and more preferably 1 to 2.

The abrasive included in the CMP slurry is used in an amount of 0.1 to 20% by weight of the slurry. Phosphoric acid is added in an amount of 0.01 to 20% by weight of the slurry, preferably 0.2 to 10 wt %. When the abrasive included in the slurry is used in an amount below 0.1% by weight of the slurry, a polishing speed does not reach a predetermined level. In the case that the abrasive is used in an amount over 20% by weight of the slurry, a defect such as a scratch is generated due to a mechanical factor, and a prime cost of the slurry is increased.

In addition, phosphoric acid polishes a nitride film faster than an oxide film. Therefore, an etching selectivity to the nitride film over oxide film is increased by adding phosphoric acid.

When phosphoric acid is added to the slurry, pH is maintained from 1 to 5, preferably 1 to 3, and more preferably 1 to 2. Here, pH can be adjusted by using a buffer solution containing a hydroxyl group (—OH).

When phosphoric acid is used in an amount below 0.01% by weight of the slurry, the desired low pH is not obtained and a chemical reaction due to phosphoric acid is not generated. In the case that phosphoric acid is used in an amount over 20% by weight of the slurry, adverse etching or other chemical reactions can occur which deteriorate planarization.

The abrasive added to the slurry is a general abrasive. For example, an abrasive containing $CeO_2$, $MnO_2$, $ZrO_2$, $Al_2O_3$ or $SiO_2$ is used. Preferably, the abrasive containing $CeO_2$ is used.

Here, a grain size of the abrasive ranges from about 100 nm to about 500 nm. Preferably, the abrasive remains in a colloidal suspension in the slurry.

When the abrasive has a grain size below 100 nm, the polishing speed is decreased to reduce productivity. When an average grain size of the abrasive exceeds 500 nm, the abrasive is not actively dispersed, thereby causing a scratch.

The slurry is used for the CMP or patterning process of the nitride film by employing the oxide film as an stopping layer which is an interlayer dielectric layer in the damascene metal gate process or self aligned contact (abbreviated as 'SAC') process for forming a capacitor contact. In addition, when the nitride film to be polished is deposited according to a chemical vapor deposition (abbreviated as 'CVD') process, and the CMP process is performed thereon by using the disclose slurry, the etching selectivity to the oxide film is decreased.

Another aspect of the present invention provides a method for pattering an SiN or SiON film according to the CMP process by using the disclosed slurry, especially a method for applying the disclosed slurry to the damascene metal gate process and the SAC process for forming the capacitor.

A SiO film serving as a stopping layer is formed at the lower portion of the SiN or SiON film.

The disclosed nitride CMP slurry will now be described in detail by referring to the examples below, which are not intended to be limiting.

The slurry was prepared by adding deionized water and phosphoric acid to HS-8005-A9 (Hitachi Chemical) CMP slurry containing $CeO_2$ abrasive.

COMPARATIVE EXAMPLE 1

HS-8005-A9 CMP slurry containing 5 wt % of $CeO_2$ abrasive was diluted by adding deionized water. 10L of CMP slurry containing 1 wt % of $CeO_2$ was prepared. Here, pH is 8.19 (refer to FIG. 1).

INVENTION EXAMPLE 1

0.02 wt % of phosphoric acid was added to the slurry prepared in Comparative Example 1. Here, pH is 3.00 (refer to FIG. 1).

INVENTION EXAMPLE 2

0.20 wt % of phosphoric acid was added to the slurry prepared in Comparative Example 1. Here, pH is 1.97 (refer to FIG. 1).

INVENTION EXAMPLE 3

0.50 wt % of phosphoric acid was added to the slurry prepared in Comparative Example 1. Here, pH is 1.86 (refer to FIG. 1).

INVENTION EXAMPLE 4

1.00 wt % of phosphoric acid was added to the slurry prepared in Comparative Example 1. Here, pH is 1.67 (refer to FIG. 1).

INVENTION EXAMPLE 5

5.00 wt % of phosphoric acid was added to the slurry prepared in Comparative Example 1. Here, pH is 1.18 (refer to FIG. 1).

INVENTION EXAMPLE 6

The N/O polishing selectivity of the slurries prepared in Comparative Example 1 and Invention Examples 1 to 5 was obtained according to the CMP process by using an oxide film such as a high density plasma (HDP) oxide film or undoped silicate glass (USG) oxide film and a nitride film such as a plasma enhanced nitride (PEN) film or low pressure nitride (LPN) film. Here, the polishing conditions were a head pressure of 3 psi and a table revolution of 70 rpm.

Figure 2:
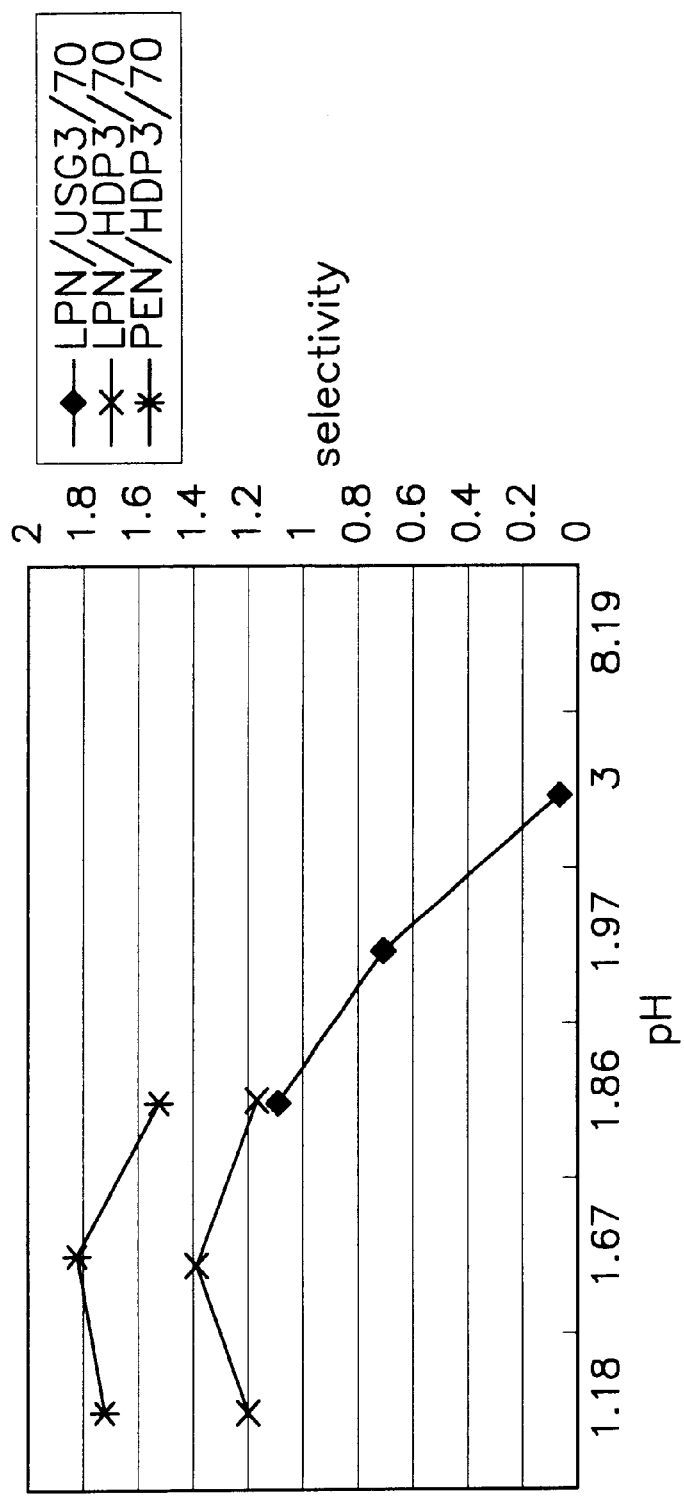
FIG. 2 illustrates, graphically, N/O selectivity by pH variations of the slurry.

As a result, when phosphoric acid is used in an amount over 0.50 wt %, namely when pH is below 1.86, the N/O polishing selectivity exceeds 1. That is, when pH is lower than 1.86, the selectivity exceeds 1. On the other hand, when the plasma enhanced nitride film is employed, the selectivity is approximate to 2. It implies that the nitride film is polished faster than the oxide film (refer to FIG. 2).

As a result, when phosphoric acid is used in an amount over 0.50 wt %, namely when pH is below 1.86, the N/O polishing selectivity exceeds 1. That is, when pH is lower than 1.86, the selectivity exceeds 1. On the other hand, when the plasma enhanced nitride film is employed, the selectivity is approximate to 2. It implies that the nitride film is polished faster than the oxide film (refer to FIG. 2).

What is claimed is:

1. A CMP slurry composition for nitride films and not metal films, the CMP slurry comprising an abrasive and phosphoric acid, the CMP slurry having a nitride to oxide selectivity ratio of greater than 1 wherein the abrasive is selected from the group consisting of $CeO_2$, $MnO_2$, $ZrO_2$, $Al_2O_3$, and combinations thereof and having a grain size of the abrasive ranging from about 100 nm to about 500 nm.

2. The composition according to claim 1, wherein pH of the slurry composition ranges from about 1 to about 5.

3. The composition according to claim 1, wherein pH of the slurry composition ranges from about 1 to about 3.

4. The composition according to claim 1, wherein pH of the slurry composition ranges from about 1 to about 2.

5. The composition according to claim 1, wherein phosphoric acid is present in an amount ranging from about 0.01 to about 20% by weight of the slurry.

6. The composition according to claim 1, wherein phosphoric acid is present in an amount ranging from about 0.2 to about 10% by weight of the slurry.

7. The composition according to claim 1, wherein the abrasive is present in an amount ranging from about 0.1 to about 20% by weight of the slurry.

8. The composition according to claim 1, wherein the is maintained as a colloidal suspension in the slurry.

9. The composition according to claim 1, further comprising a buffer solution.

10. The composition according to claim 9, wherein the buffer solution comprises a compound containing a hydroxyl group (—OH).

11. A CMP slurry composition for polishing nitride films not metal films, the composition comprising an abrasive in an amount ranging from about 0.1 to 20% by weight of the slurry and phosphoric acid in an amount ranging from about 0.01 to about 20% by weight of the slurry a grain size of the abrasive ranging from about 100 nm to about 500 nm.

12. The composition according to claim 11, wherein pH of the slurry composition ranges from about 1 to about 5.

13. A method for patterning nitride films and not metal films, the method comprising the steps of:
    coating a semiconductor substrate with an oxide film and then one or more nitride films; and
    patterning the one or more nitride films with a CMP process by using the composition of claim 1.

14. The method according to claim 13, wherein the oxide film is an SiO film and the one or more nitride films comprises one or more SiN films or one or more SiON films or a combination thereof, and wherein the SiO layer is used as a stop layer.

15. The method according to claim 13, wherein the method is applied to one of damascene process or a SAC process.

16. A semiconductor device manufactured according to the method of claim 13.

* * * * *

UNITED STATES PATENT AND TRADEMARK OFFICE
CERTIFICATE OF CORRECTION

PATENT NO. : 6,746,314 B2
DATED : June 8, 2004
INVENTOR(S) : Hyung H. Kim et al.

It is certified that error appears in the above-identified patent and that said Letters Patent is hereby corrected as shown below:

Column 4,
Line 31, please delete "the is" and replace with -- the abrasive is --.
Lines 38-39, please delete "films not metal films," and replace with --films and not metal films, --.
Line 58, please delete "one of damascene" and replace with -- one of a damascene --.

Signed and Sealed this

Twenty-first Day of September, 2004

JON W. DUDAS
*Director of the United States Patent and Trademark Office*